US012551411B1

(12) United States Patent
Evenson et al.

(10) Patent No.: US 12,551,411 B1
(45) Date of Patent: Feb. 17, 2026

(54) PHARMACY PILL VIEWER

(71) Applicant: Government of the United States, as represented by the Secretary of the Air Force, Wright-Patterson AFB, OH (US)

(72) Inventors: Adam Evenson, Del Rio, TX (US); Austin Schmidle, Laughlin AFB, TX (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 306 days.

(21) Appl. No.: 18/500,553

(22) Filed: Nov. 2, 2023

Related U.S. Application Data

(60) Provisional application No. 63/585,640, filed on Sep. 27, 2023.

(51) Int. Cl.
*A61J 7/02* (2006.01)

(52) U.S. Cl.
CPC .................................... *A61J 7/02* (2013.01)

(58) Field of Classification Search
CPC .......... A61J 7/00; A61J 7/0069; A61J 7/0076; A61J 7/02; B65D 25/40; B65D 25/42; B65D 25/54; B65D 83/04; G07F 17/0092
USPC .......................... 206/528, 540; 220/571, 573
See application file for complete search history.

(56) References Cited

U.S. PATENT DOCUMENTS

| | | | | | |
|---|---|---|---|---|---|
| 2,706,072 | A * | 4/1955 | Furno | A61J 7/02 | 222/196 |
| 2,754,030 | A * | 7/1956 | Waber | B65D 83/0409 | 221/269 |
| 3,038,642 | A * | 6/1962 | Van Handel | A61J 7/02 | 222/129 |
| 3,169,643 | A | 2/1965 | Roberts | | |
| 5,433,256 | A | 7/1995 | Vasers | | |
| D432,308 | S | 10/2000 | Lockhart | | |
| 8,172,112 | B2 * | 5/2012 | Karwacki, Jr. | G07F 17/0092 | 222/196 |
| 8,714,405 | B2 * | 5/2014 | Farnsworth | G07F 17/0092 | 221/10 |
| 9,532,928 | B2 | 1/2017 | Devita et al. | | |
| D799,826 | S | 10/2017 | Devita et al. | | |
| 9,873,545 | B2 | 1/2018 | Devita et al. | | |
| D950,952 | S | 5/2022 | Kennedy, III et al. | | |
| 2006/0283766 | A1 | 12/2006 | Koh | | |

* cited by examiner

*Primary Examiner* — Bryon P Gehman
(74) *Attorney, Agent, or Firm* — AFMCLO/JAZ; Richard M. Mescher

(57) ABSTRACT

A pharmacy pill tray for viewing and/or counting pills includes a viewing portion comprising a substantially planar floor surface for supporting the pills thereon, an enclosed funnel extending from the viewing portion and configured to selectively receive pills from the support surface, and a spout extending from the enclosed funnel and having an inner diameter provided with a structure sized and shaped to selectively cooperate with an external thread of first-sized pill vial to removably secure the spout to the first-sized pill vial for transferring pills between the spout and the first-sized pill vial. The spout has an outer diameter sized to be selectively and closely inserted into a second-sized pill vial that is larger than the first-sized pill bottle vial for transferring pills between the spout and the second-sized pill vial.

20 Claims, 12 Drawing Sheets

PHARMACY PILL VIEWER

Pursuant to 37 C.F.R. § 1.78(a)(4), this application claims the benefit of and priority to prior filed Provisional Application Ser. No. 63/585,640, filed Sep. 27, 2023, which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally pharmacy pill counter and/or viewer tray and, more particularly, to a pharmacy pill counter and/or viewer tray for pharmacy use that reduces prescription fill errors.

BACKGROUND OF THE INVENTION

Many pharmacies store pills in large bulk-stock containers. The pills are then counted, packaged into smaller containers, labeled for use, and dispensed to customers as needed. The classic tool for counting pills is a manual pill counting tray. To use a manual pill counting tray, the user first deposits an unknown quantity of pills from a bulk-stock container onto a counting surface or platform of the pill counting tray. A spatula or the like is then used to move pills from this surface into an adjoining depressed trough or other dispensing means. Pills moved into the trough are destined to be dispensed. Therefore, the user is required to remember the changing count of pills reaching the trough throughout the counting process. Once the desired quantity of pills is in the trough, the user closes a lid that blocks further pills from being deposited into the trough. By tilting the pill counting tray, the user can return uncounted pills, still located on the counting platform, back into the bulk-stock container. By tilting the tray in a different direction, counted pills are released from the trough through a funnel or spout into a prescription container such as, for example but not limited to, a vial, bottle, or the like. At any one pharmacy, this process can be repeated several hundred times during a single day.

These manual pill counting trays have many virtues including durability, low cost, universal applicability to pills of varying shapes and sizes, minimal training requirements, and reputation as a time-honored standard to achieve pill dispensation. In addition, as pills are damaged or different pills are intermixed, it provides an opportunity for the user to visually assess the pills and remove any damaged pills and/or incorrect type of pills as they are counted. The manual pill counting trays also have drawbacks including accuracy limited to the capability of the user and concomitant limitations in speed of use. Reliance on human vision and memory as a means of counting is inherently error prone. This inaccuracy can further be explained by distractions that disrupt concentration of the user while counting. Additionally, the process itself is fatiguing, thus increasing the likelihood of user errors.

To improve drug distribution, control inventory, reduce labor, and decrease medication errors, many pharmacies have implemented automated systems for filling prescriptions. However, despite these benefits, and contrary to expectations, studies have shown that the number of prescription filling errors tends to increase with the implementation of automated systems.

As a result, all automatically filled prescriptions are required to undergo a process known as Full Visual Verification (FVV). This FVV process requires a pharmacist to pour the contents of each automatically filled prescription vial onto a pill counting tray to ensure product consistency. Upon verification that a prescription contains the correct type and number of pills, the pharmacist transfers the contents of the pill counting tray back into the prescription vial. The high volume of prescriptions filled in a typical pharmacy each day often requires the pharmacists to perform the FVV process for many automatically filled prescriptions in sequence. This highly repetitive process of transferring large numbers of pills to and from their respective containers naturally lends itself to errors. One such error, with potentially life-threatening consequences, is commingling of medications due to the inadvertent transfer of stray pill(s) from one prescription vial to another. Structural features of the pill counting tray itself, such as crevices in which pills become temporarily lodged and/or blind spots that limit the pharmacist's ability to identify stray pills, can be a significant factor in these comingling events. In view of the unlimited variety of pill sizes, colors, and shapes (e.g., round, oblong, oval, elliptical, square, cylindrical, rectangular, diamond-shaped, cone-shaped triangular, crescent-shaped, trapezoidal, pentagonal, hexagonal, heptagonal, octagonal etc.) even minor surface disruptions within a pill viewing tray represent potential areas in which a pill may become lodged.

Accordingly, an improved pharmacy pill counter and/or viewer tray is needed that allows pharmacists to dispense prescription vial contents and/or verify the accuracy and consistency of prescription vial contents in a safe and efficient manner.

SUMMARY OF THE INVENTION

The present invention overcomes at least some of the foregoing problems and other shortcomings, drawbacks, and challenges of eliminating prescription filling errors. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a pharmacy pill tray for viewing and/or counting pills for use with a pill vial having an external thread comprises a viewing portion comprising a substantially planar floor surface for supporting the pills thereon, an enclosed funnel extending from the viewing portion and configured to selectively receive pills from the support surface; and a spout extending from the enclosed funnel and having an inner diameter provided with a structure sized and shaped to selectively cooperate with the external thread of the pill vial and removably secure the spout to the pill vial for transferring pills between the spout and the pill vial.

According to another embodiment of the present invention, a pharmacy pill tray for viewing and/or counting pills for use with a first pill vial having an external thread and a second pill vial that is larger than the first pill vial comprises a viewing portion comprising a substantially planar floor surface for supporting the pills thereon, an enclosed funnel extending from the viewing portion and configured to selectively receive pills from the support surface, and a spout extending from the enclosed funnel and having an inner diameter provided with a structure sized and shaped to selectively cooperate with the external thread of the first pill vial and removably secure the spout to the pill vial for transferring pills between the spout and the first pill vial and an out diameter sized to selectively be closely inserted into the second pill vial.

According to yet another embodiment of the invention, a pharmacy pill tray for viewing and/or counting pills comprises a viewing portion comprising a first substantially planar floor surface for supporting the pills thereon; a connecting portion extending from the viewing portion and comprising a second substantially planar floor surface for supporting the pills thereon and extending from the first floor surface, an enclosed funnel extending from the connecting portion and having a passage extending from a rectangular-shaped inlet opening that opens into the connecting portion to selectively receive pills from the second support surface to a circular-shaped outlet opening, wherein the connecting portion is trapezoidal shaped and oriented to direct the pills toward the rectangularly shaped inlet opening of the enclosed funnel, and a tubular shaped spout extending from the enclosed funnel to receive the pills from the circular-shaped outlet of the funnel and having a circular-shaped outer surface with a substantially constant outer diameter and a circular shaped inner surface with a substantially constant inner diameter.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
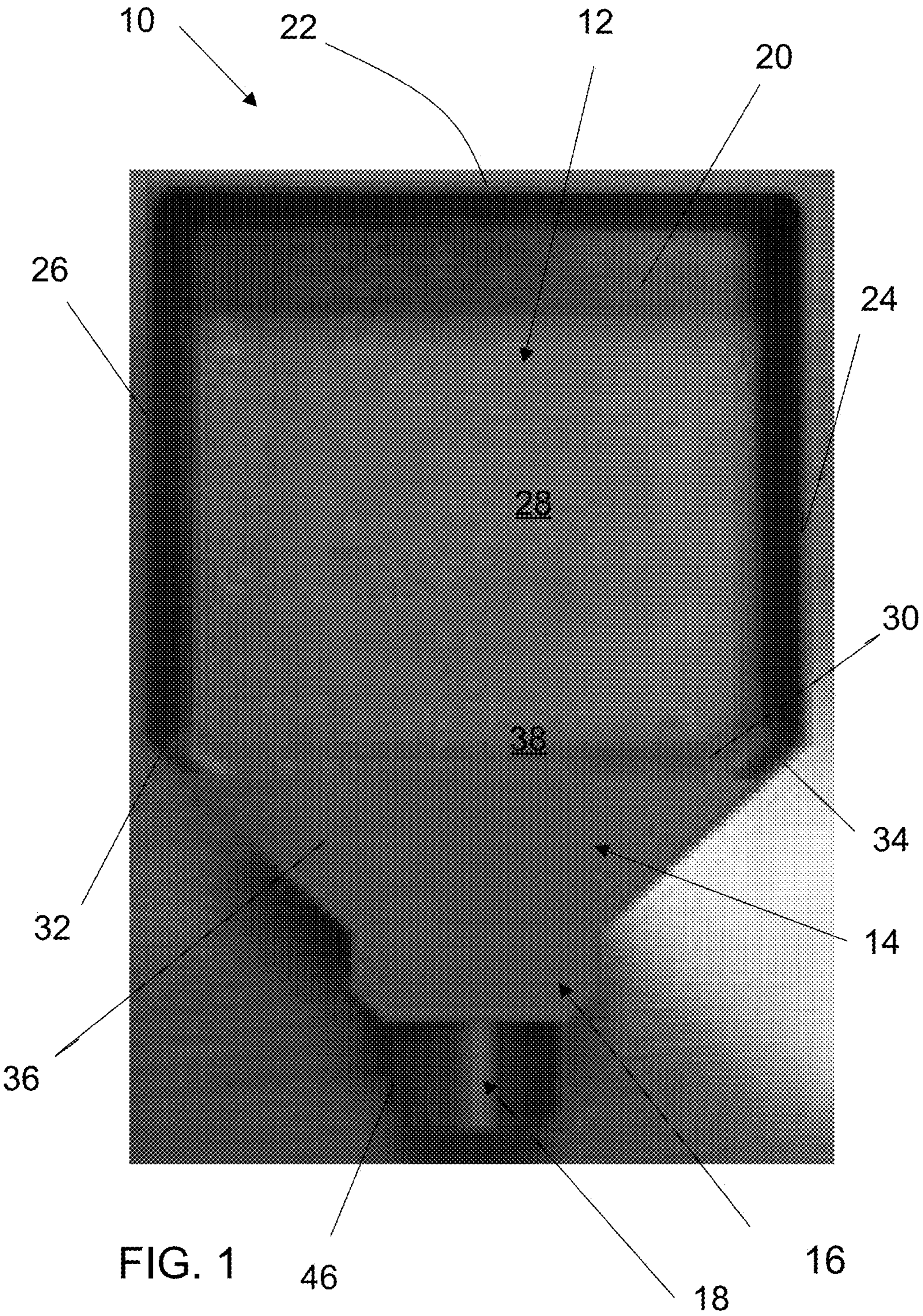
FIG. 1 is a top view of a pill counter and/or viewer tray according to an embodiment of the present invention.
Figure 2:
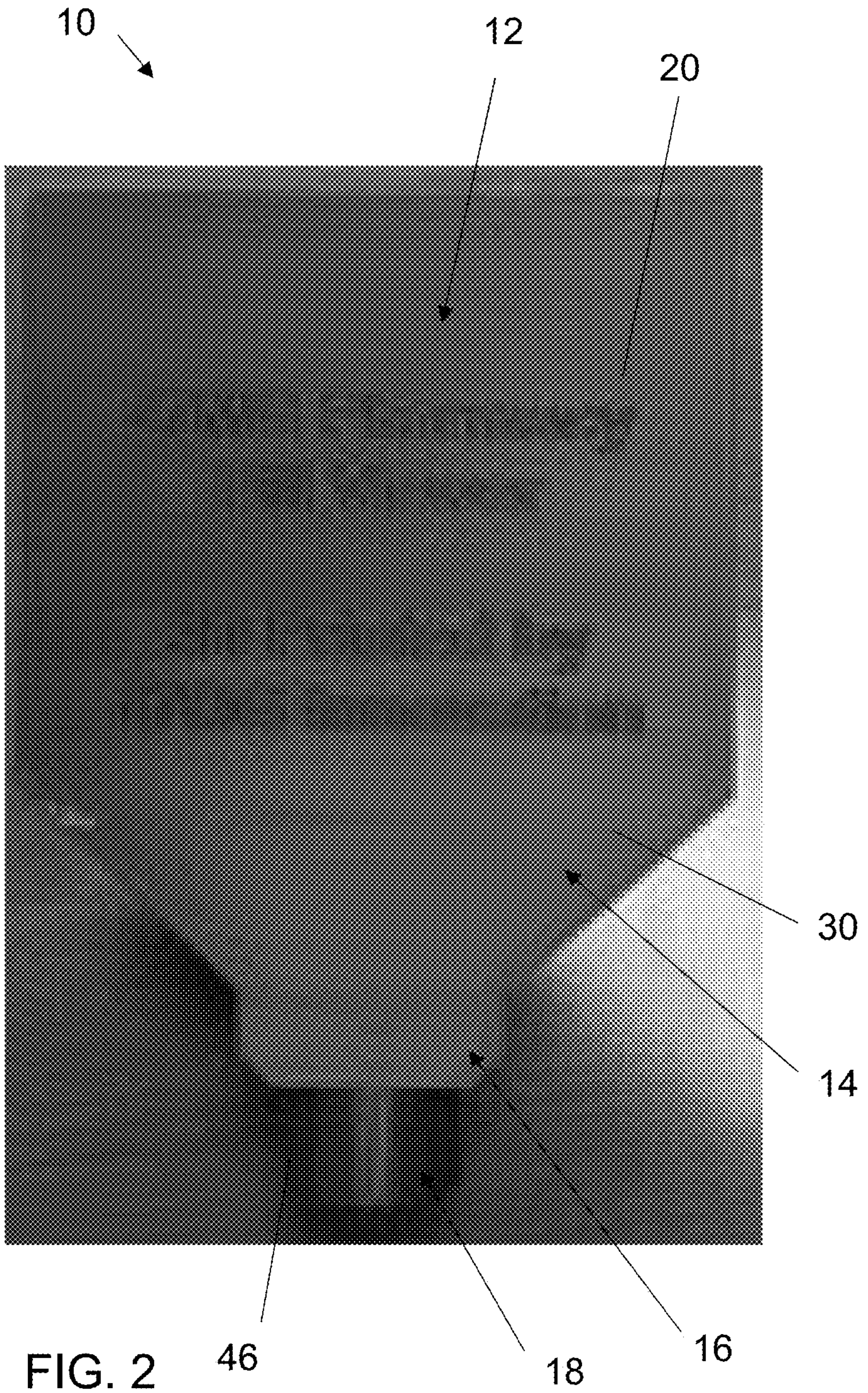
FIG. 2 is a bottom view of the pill counter and/or viewer tray of FIG. 1.
Figure 3:
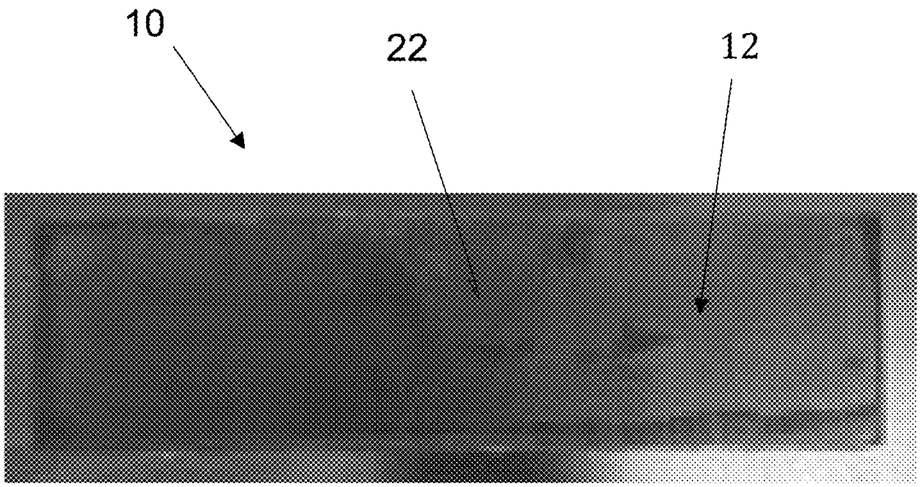
FIG. 3 is a rear view of the pill counter and/or viewer tray of FIGS. 1 and 2.
Figure 4:
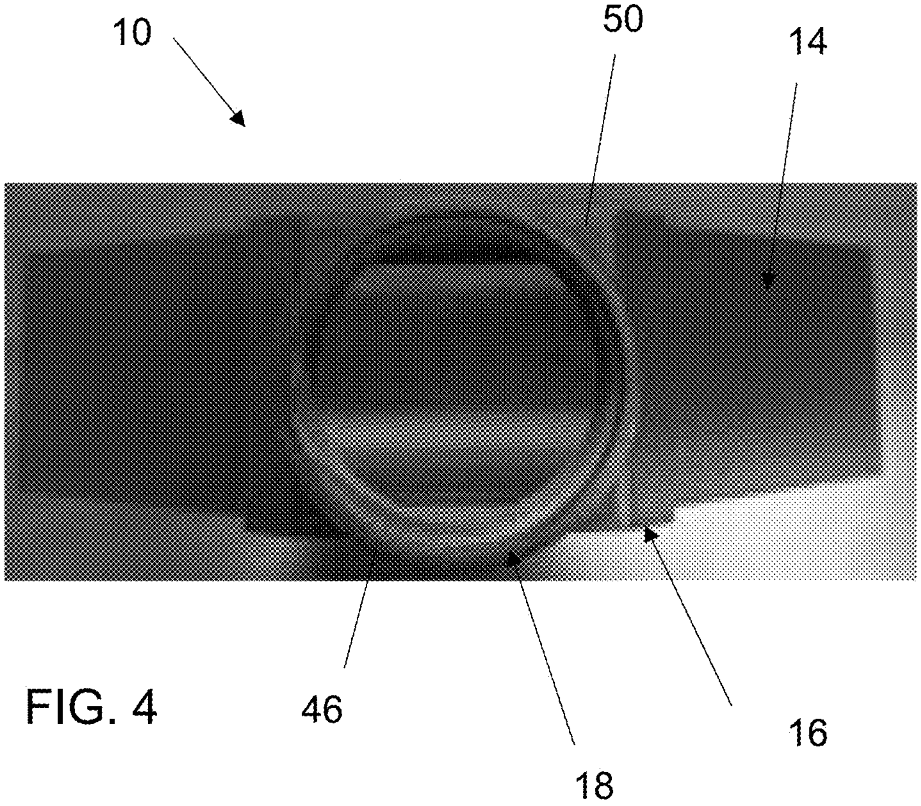
FIG. 4 is a front view of the pill counter and/or viewer tray of FIGS. 1 to 3.
Figure 5:
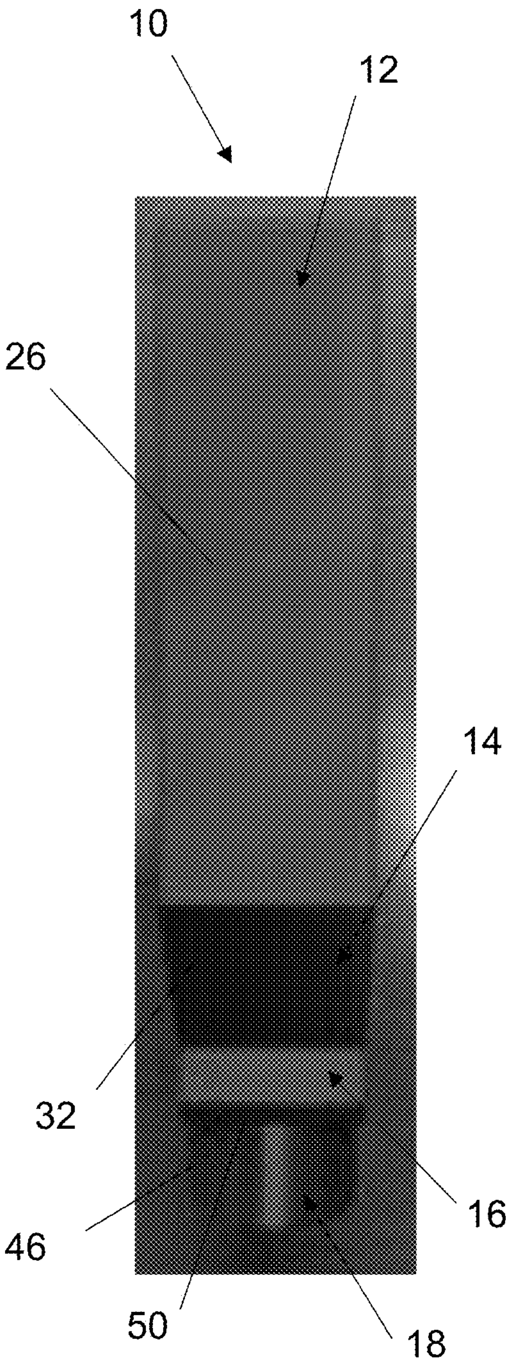
FIG. 5 is a right-side view of the pill counter and/or viewer tray of FIGS. 1 to 4.
Figure 6:
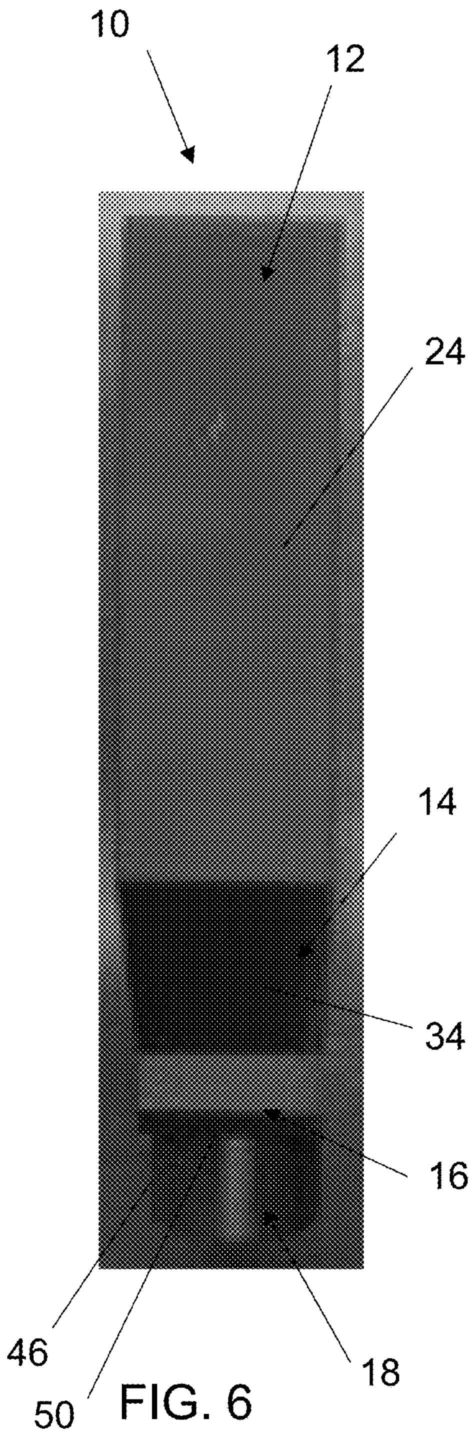
FIG. 6 is a left-side view of the pill counter and/or viewer tray of FIGS. 1 to 5.
Figure 7:
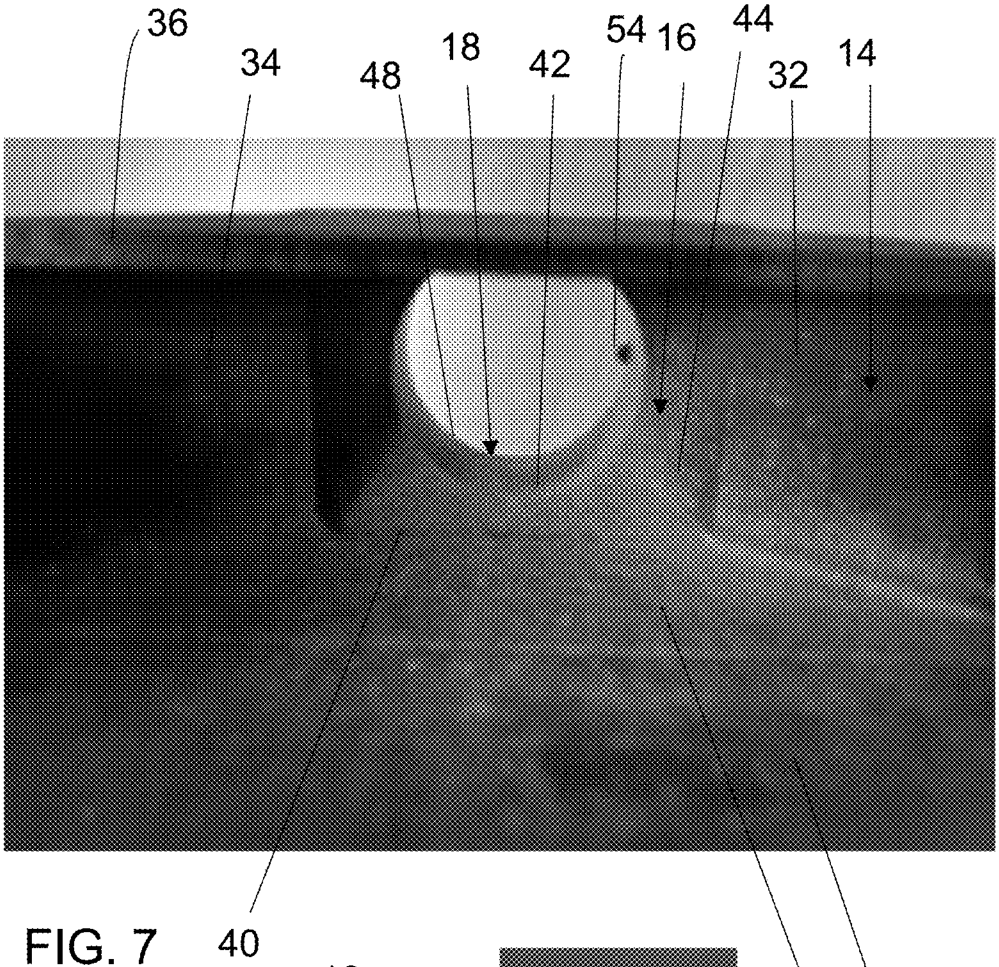
FIG. 7 is an enlarged and fragmented rear view of a spout of the pill counter and/or viewer tray of FIGS. 1 to 6.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following examples illustrate particular properties and advantages of some of embodiments of the present invention. Furthermore, these are examples of reduction to practice of the present invention and confirmation that the principles described in the present invention are therefore valid but should not be construed as in any way limiting the scope of the invention.

Referring to the drawings, and to FIGS. 1 to 7 in particular, a pill counter and/or viewer tray 10 in accordance with an exemplary embodiment of the present invention is illustrated. The pill counter and/or viewer tray 10 may be interchangeably referred to herein as a "pill viewer", a "pill counter, or a "pill tray." The phrase "and/or," as used in this specification should be understood to mean "either or both" of the elements being referred to, i.e., elements that are conjunctively present in some instances and disjunctively present in other instances. Other elements may optionally be present other than the elements specifically identified by the "and/or" clause, whether related or unrelated to those elements specifically identified unless clearly indicated to the contrary. As used in this specification and claims, the term "funnel" means any object forming a passage that is wider at an entrance and narrower at exit, used for guiding liquids or solids into a smaller opening. As used in this specification and the claims, the term "pill" means any suitable pharmaceutical dosage form for example, but not limited to caplets, capsules, chewables, gelcaps, meltlets, spansules, softgels, tablets, and the like. As used in this specification, the term "preferably" refers to one or more exemplary embodiments of the invention and therefore is not to be interpreted in any limiting sense. As used in this specification and the claims, the term "spout" means any object having a passage through which liquid or solid contents of a container may be passed or poured. It will be further understood that terms of orientation and/or position as may be used throughout the specification, such as upper, lower, rear, side, forward, downward, upward, inner, and so on, as well as their derivatives and equivalent terms, relate to relative rather than absolute orientations and/or positions.

The illustrated pill counter and/or viewer tray 10 preferably comprises a first or viewing portion 12, a second or connecting portion 14 extending forward from the viewing portion 12, a third or funnel portion 16 extending forward from the connecting portion 14, and a fourth or spout portion 18 extending forward from the funnel portion 16. In this illustrated embodiment, the viewing portion 12, the connecting portion 14, the funnel portion 16, and the spout portion 18 are formed together as a single one-piece component as described in more detail hereinafter. It is noted however, that alternatively the pill counter and/or viewer tray 10 can be formed by any number of separate components that secured together as described in more detail hereinbelow.

The first or viewing portion comprises a substantially-planar main wall 20, a first or rear-side wall 22, a second or right-side wall 24, and a third or left-side wall 26. The illustrated main wall forms a substantially planar and upward facing first floor surface 28. The illustrated main wall 20 is substantially square shaped. The first floor surface 28 is preferably smooth and free of any structures or defects which may impede the free movement of pills along the first floor surface 28. The rear-side wall 22 upwardly extends from a rear edge of the main wall 20 and is substantially perpendicular to the main wall 20. The illustrated rear-side wall 22 is substantially straight or planar and has a height which is about one-third of the length and/or width of the main wall 20. The right-side wall 26 upwardly extends from a right-side edge of the main wall 20 and is substantially perpendicular to both the main wall 20 and the rear-side wall 22. The illustrated right-side wall 26 is substantially straight or planar and has a height which is substantially the same as the rear side wall 22. That is, the right-side wall 26 is about one-third of the width and/or length of the main wall 20. The left-side wall 24 upwardly extends from a left-side edge of the main wall 20 and is substantially perpendicular to both the main wall 20 and the rear-side wall 22. The illustrated left-side wall 24 is substantially straight or planar and has a height which is substantially the same as the rear side wall 22. That is, the left-side wall 24 is about one-third of the width and/or length of the main wall 20. The illustrated rear-side, left-side, and right-side walls 22 to 26 are continuous to enclose the first floor-surface 28 on all but its forward side and the upward direction. It is noted that illustrated joints have sharp edges at locations not engaged by pills, but interior joints are radiused or smooth to provide a robust structure while not impeding movement of pills. It is also noted that the viewing portion 12 can alternatively have any other suitable configuration.

The second or connecting portion 14 comprises a substantially planar main wall 30, a first or right-side wall 32, a second or left-side wall 34, and a substantially planar top wall or cover 36. The illustrated main wall 30 forms a substantially planar and upward-facing second floor surface 38 which is continuous with the first floor surface 28. The illustrated main wall 30 is substantially trapezoidal shaped where the rear side has a greater length than the front side. The second floor-surface 38 is preferably smooth and free of any structures or defects which may impede the free movement of pills along the second-floor surface 38 and/or transitioning between the first or second floor surfaces 28, 38. The right-side wall 32 upwardly extends from a right edge of the main wall 30 and is substantially perpendicular to the main wall 30. The illustrated right-side wall 32 is substantially straight or planar and has a height which is about one-third of the width of the main wall 30 and the same as the right-side wall 26 of the viewing portion 12 so that it is a continuation of the right-side wall 26 of the viewing portion 12. From the rear side of the main wall 30, the right-side edge of the main wall 30, and thus also the right-side wall 32, angles inwardly in the forward direction. The left-side wall 34 upwardly extends from a left edge of the main wall 30 and is substantially perpendicular to the main wall 30. The illustrated left-side wall 34 is substantially straight or planar and has a height which is about one-third of the width of the main wall 30 and the same as the left-side wall 24 of the viewing portion 12 so that it is a continuation of the left-side wall 24 of the viewing portion 12. From the rear side of the main wall 30, the left-side edge of the main wall 30, and thus also the left-side wall 34, angles inwardly in the forward direction. Thus, the left-side and right-side walls of the connecting portion form a first funnel for directing pills toward the funnel portion 16 as described hereinafter. The illustrated right-side and left-side walls 32, 34 are continuous to enclose the second floor surface 38 on all but its forward side, rearward side, and most of the upward direction. It is again noted that illustrated joints have sharp edges at exterior locations not engaged by pills, but interior locations are radiused or smooth to provide a robust structure while not impeding movement of pills. It is also noted that the connecting portion can alternatively have any other suitable configuration.

The illustrated top wall or cover 36 sized to at least substantially close the top opening formed above the main wall 30 formed by the right and left sidewalls 32, 34 of the connecting portion 14. The illustrated cover 36 is a substantially planar wall that is upwardly spaced-apart from and parallel with the main-wall 30 and is a continuous extension of the right and left sidewalls 32, 34. The illustrated cover 36 covers about two-thirds of the forward portion of the connecting portion 14, but any other suitable size can alternatively be utilized. It is noted that the cover 36 can alternatively be eliminated or can alternatively have any other suitable configuration.

The illustrated funnel portion 16 extends forward from the connecting portion 14 and closes the opening formed at the forward end of the connection portion 14 that is formed above the second main-wall 30 by the right and left sidewalls 32, 34 and the cover 36. The illustrated funnel portion is generally a rectangular shaped block which is an extension of the connecting portion 14 having a height matching the height between the outer sides of the main-wall 30 and the cover 36 and having a width equal to the width between the outer side of the right and left sidewalls 32, 34 at their forward end. Thus, the illustrated funnel portion 16 has a greater width than height and a greater height than length. A forwardly extending passage extends entirely through the funnel portion 16 in the forward/rearward direction from an inlet opening 40 at the rearward end to an outlet opening 42 at the forward end. The inlet opening 40 at the rearward end of the passage is sized and shaped to correspond with the opening formed by the forward end of the connecting portion 14. Thus, the illustrated inlet opening 40 is rectangular shaped. The outlet opening 42 at the forward end of the passage is sized and shaped to cooperate with the spout portion 18 as described in more detail hereinbelow. Thus, the illustrated outlet opening 42 is circular. The illustrated outlet opening 42 is sized smaller than the inlet opening 40 to form a second funnel for directing pills toward the spout portion 18. The passage connecting the inlet and outlet openings 40, 42 provides a smooth transition therebetween for smooth passage of pills in either direction. It is noted that the illustrated passage wall 44 of the funnel portion 16 has a steeper angle than the sidewalls 32, 34 of the connecting portion 14 (best seen in FIG. 7). It is also noted that the funnel portion 16 can alternatively have any other suitable configuration.

The illustrated spout portion 18 includes a spout 46 forwardly extending from the funnel portion 16. The illustrated spout 46 includes a passage therethrough in the forward/rearward direction from an inlet opening at the rearward end of the spout 46 and coinciding with the outlet opening 42 of the funnel portion 16 to an outlet opening 48 at a forward or free end of the spout 46. The illustrated spout 46 is tubular shaped having a circular-shaped outer surface with a substantially constant outer diameter (OD) over its entire length and a circular shaped inner surface with a substantially constant inner diameter (ID) over its entire length. The illustrated outer surface of the spout 46 is smaller than the illustrated forward end of the funnel portion 16 to form a forward-facing abutment 50 at the intersection of the funnel and spout portions 16, 18. The outer diameter (OD) of the outer surface of the spout 46 is sized and shaped to be closely received within an inner diameter (ID) of a first-sized prescription container or vial 52A. That is, the outer diameter (OD) of the spout 46 is sized to closely fit within inner diameter (ID) of the first sized or larger prescription vial or container 52A. The illustrated inner surface of the spout 46 is sized and shaped to closely receive a second-sized prescription container or vial 52B therein, where the second-sized prescription container or vial 52B is smaller than the first-sized prescription container or vial 52A. That is, the inner diameter (ID) of the spout 46 and the tab 54 (described below) are sized to closely receive the outer diameter (OD) and the external thread 56 of the second-sized or smaller prescription vial or container 52B. Thus, the illustrated spout 46 is configured to be preferably used with two different predetermined sizes of prescription containers or vials 52A, 52B. It is noted that the spout portion 18 can have any other suitable configuration such as, for example but not limited to, sizing the spout 46 for use with only a single size of prescription vials.

The prescription containers or vials 52A, 52B con be of any suitable size. For example, but not limited to, the following are some common standard sizes: 8 dram (having a height w/o cap of about 67.2 mm, an outer diameter of about 26 mm, an inner diameter of 25 mm, and a material thickness of about 0.75 mm; 13 dram (having a height w/o cap of about 68.9 mm, an outer diameter of about 32.5 mm, an inner diameter of 31.3 mm, and a material thickness of about 0.9 mm; 16 dram (having a height w/o cap of about 83.3 mm, an outer diameter of about 31.5 mm, an inner diameter of 30.4 mm, and a material thickness of about. 8 mm; 20 dram (having a height w/o cap of about 66.1 mm, an outer diameter of about 41 mm, an inner diameter of 39.5 mm, and a material thickness of about 1.0 mm; 30 dram (having a height w/o cap of about 94.7 mm, an outer diameter of about 41 mm, an inner diameter of 40.5 mm, and a material thickness of about 1.00 mm; 40 dram (having a height w/o cap of about 95.6 mm, an outer diameter of about 46 mm, an inner diameter of 44.6 mm, and a material thickness of about 0.9 mm; 60 dram (having a height w/o cap of about 141.25 mm, an outer diameter of about 46 mm, an inner diameter of 44.8 mm, and a material thickness of about 0.9 mm). Thus, the pill counter and/or viewer tray 10 can be sized for two of the vial sizes commonly used by a pharmacy. If a pharmacy uses more than two common vial sizes, additional pill counter and/or viewer trays 10 can be utilized so that there is pill counter and/or viewer tray 10 appropriately sized for each vial sized used by the pharmacy.

Figure 8:
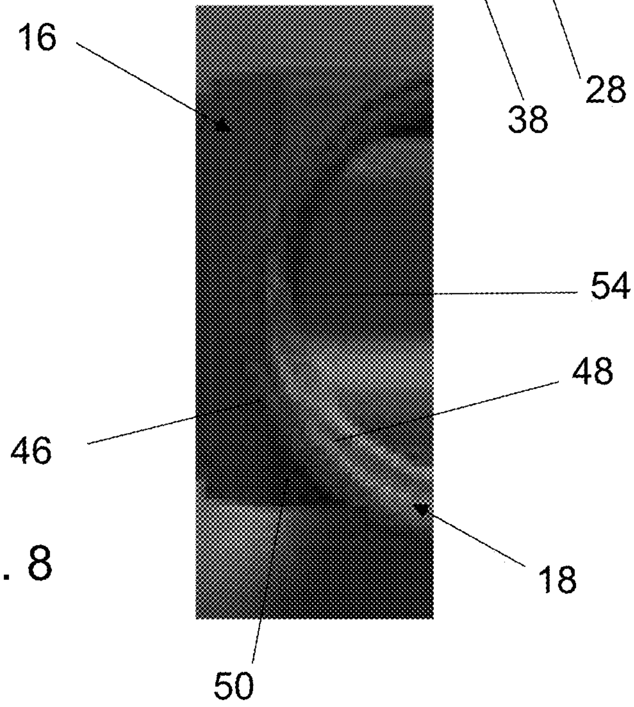
FIG. 8 is an enlarged and fragmented front view of the spout of the pill counter and/or viewer tray of FIGS. 1 to 6 showing a thread engagement tab.

As best shown in FIG. 8, the illustrated spout 46 is provided with a structure 54 for engaging an external thread 56 of the second-sized or smaller prescription container 52B to secure the second-sized or smaller prescription container 52B to the spout 46. The illustrated structure 54 is in the form of a radially inward-extending tab within the passage located substantially near or at the forward edge of the passage of the spout 46. The illustrated tab 54 is sized or shaped to permit the external thread 56 of the second-sized or smaller prescription container 52B to be threaded behind the tab 54 to selectively interlock the external thread 56 with the spout 46 (best shown in FIG. 9C). It is noted that the structure 54 can alternatively have any other suitable configuration such as, for example but not limited to, more than one tab, one or more internal threads, and the like.

Figure 9A:
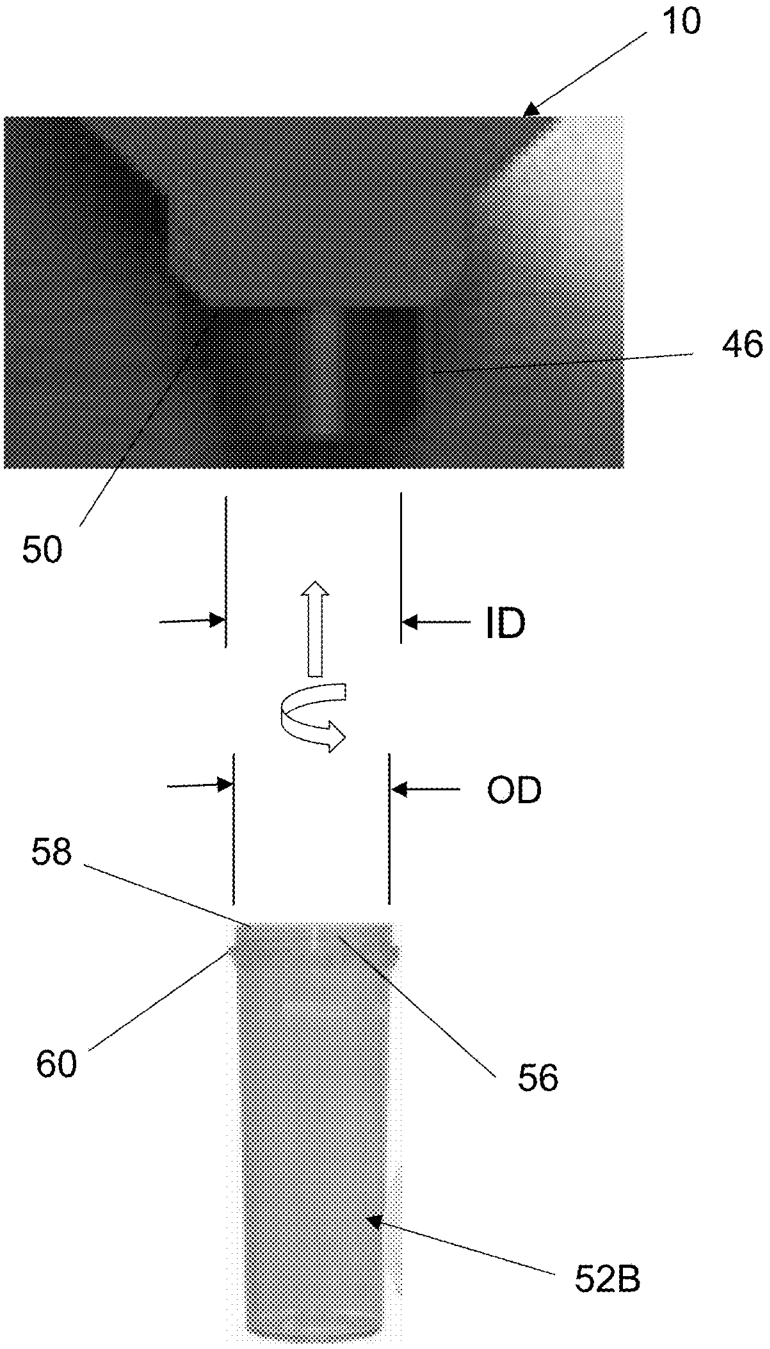
FIG. 9A is an enlarged and fragmented top exploded view of a first pill vial with the pill counter and/or viewer tray of FIGS. 1 to 8.
Figure 9B:
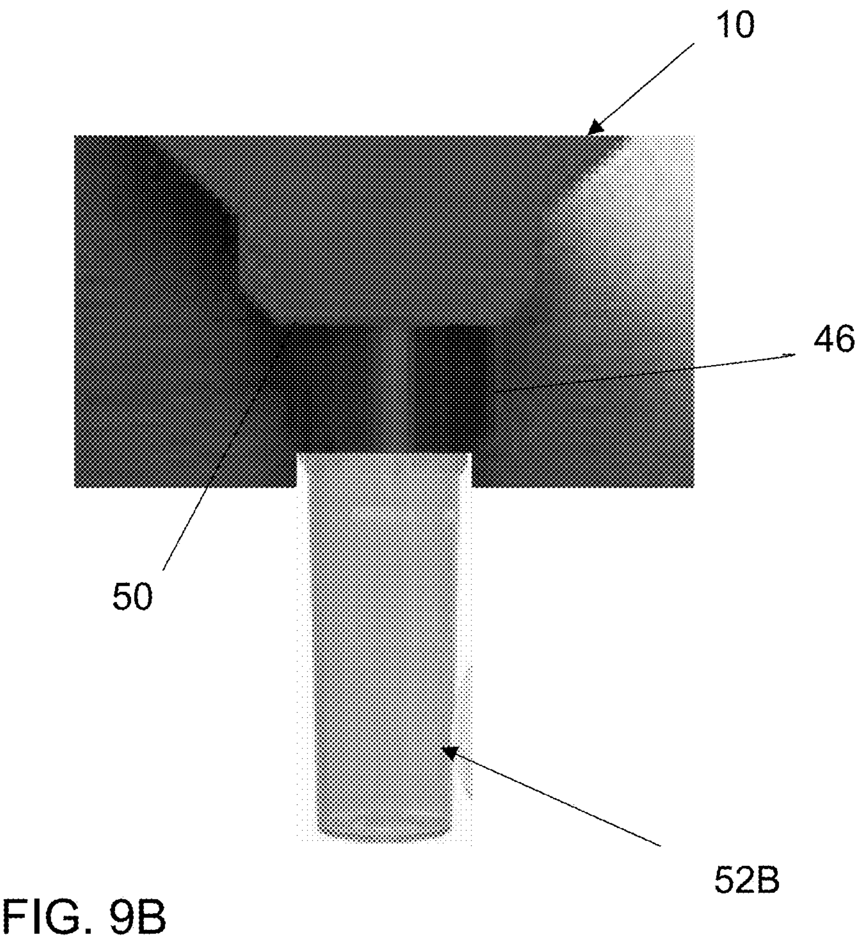
FIG. 9B is an enlarged and fragmented top view of the first pill vial engaged with the pill counter and/or viewer tray of FIG. 9A.
Figure 9C:
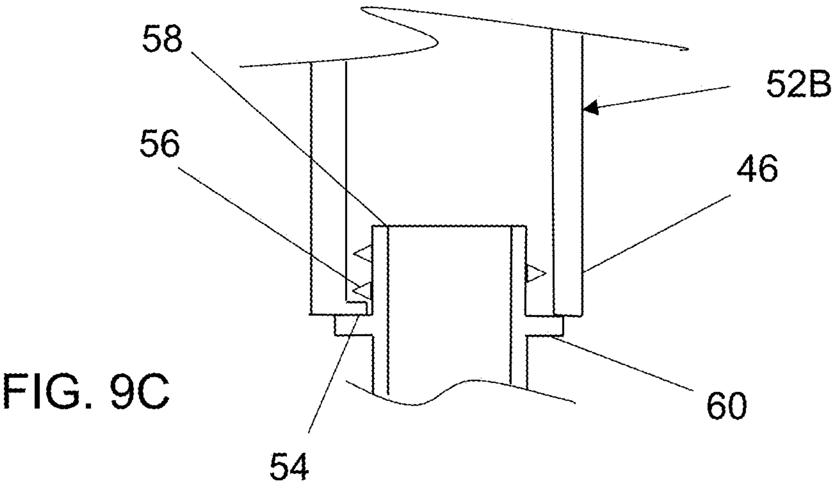
FIG. 9C is a cross-sectional view showing engagement of a thread of the pill vial with the thread engagement tab of the pill counter and/or viewer tray of FIG. 9B.

FIGS. 9A to 9C illustrate securing the second or smaller prescription vial 52B to the spout 46. First, the second-sized or smaller prescription vial 52B is moved toward the outlet opening 48 of the passage of the spout 46. By pushing the second-sized or smaller prescription vial 52B toward the passage of the spout 46 while turning the second-sized or smaller prescription vial 52B in a right-hand manner, the external thread 56 of the smaller prescription vial is threaded onto the tab 54 of the spout 46 so that the second-sized or smaller prescription vial 52B is secured to the spout 46 within the passage of the spout 46. The illustrated second-sized or smaller prescription vial 52B includes a flange or stop 60 located below the external thread 56 that engages the end of the spout to limit movement. It is noted that the prescription vial can alternatively have any other suitable configuration including the elimination of the flange or stop 60. Secured in this manner, pills can be transferred into and/or out of the second-sized or smaller prescription vial 52B from via the spout 46. To remove the second-sized or smaller prescription vial 52B from the spout 46, the procedure is reversed. That is, by pulling the second-sized or smaller prescription vial 52B away from the passage of the spout 46 while turning the second-sized or smaller prescription vial 52B in a left-hand manner, the external thread 56 of the second-sized or smaller prescription vial 52B is unthreaded off the tab 54 of the spout 46 so that the second-sized or smaller prescription vial 52B is released from the spout 46.

Figure 10A:
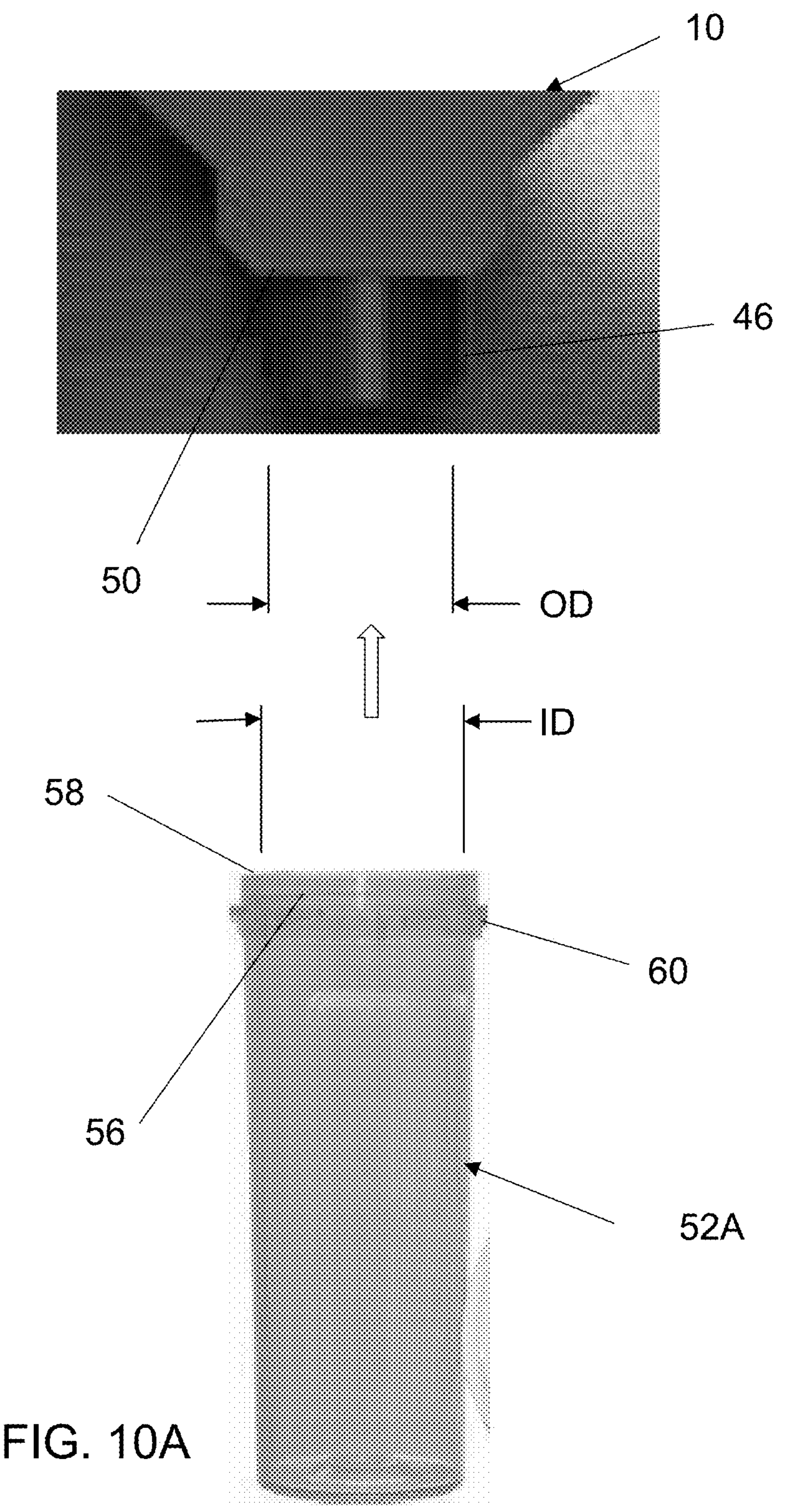
FIG. 10A is an enlarged and fragmented top exploded view of a second pill vial with the pill counter and/or viewer tray of FIGS. 1 to 8.
Figure 10B:
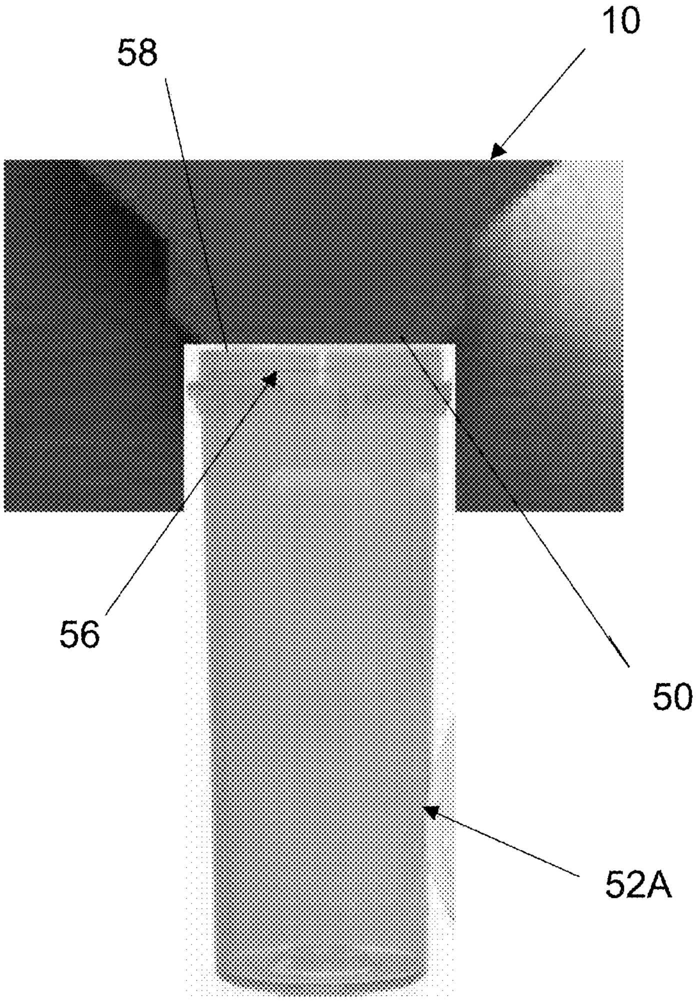
FIG. 10B is an enlarged and fragmented top view of the second pill vial engaged with the pill counter and/or viewer tray of FIG. 10A.
Figure 10C:
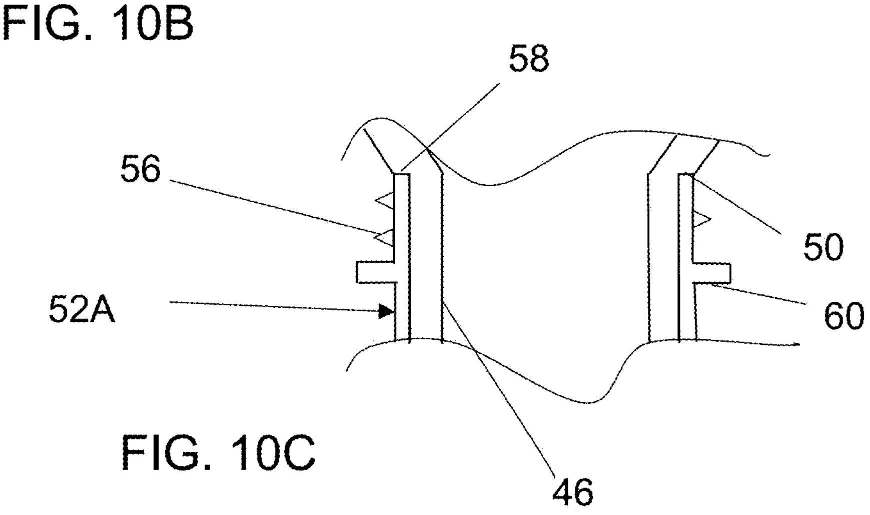
FIG. 10C is a cross-sectional view showing and end of the second pill vial engaged with an abutment of the pill counter and/or viewer tray of FIG. 9B.

FIGS. 10A to 10C illustrate securing the first-sized or larger prescription vial 52A to the spout 46. First, the first-sized or larger prescription vial 52A is moved toward the spout 46. By pushing the first-sized or larger prescription vial 52A over the spout 46 so that the spout 46 enters the first-sized or larger prescription vial 52A until the rim 58 of the first sized or larger prescription vial 52A engages the abutment 50 formed by the funnel section 16, the first-sized or larger prescription vial 52A can be secured to the spout 46 by the user maintaining pressure of the prescription vial 52A against the abutment 50. Secured in this manner, pills can be transferred into and/or out of the first-sized or larger prescription vial 52A from via the spout 46. To remove the first-sized or larger prescription vial 52A from the spout 46, the procedure is reversed. That is, by pulling the first-sized or larger prescription vial 52A away from the spout 46, the first-sized or larger prescription vial 52A slides off the spout 46 so that the first-sized or larger prescription vial 52A is released from the spout 46.

Figure 11:
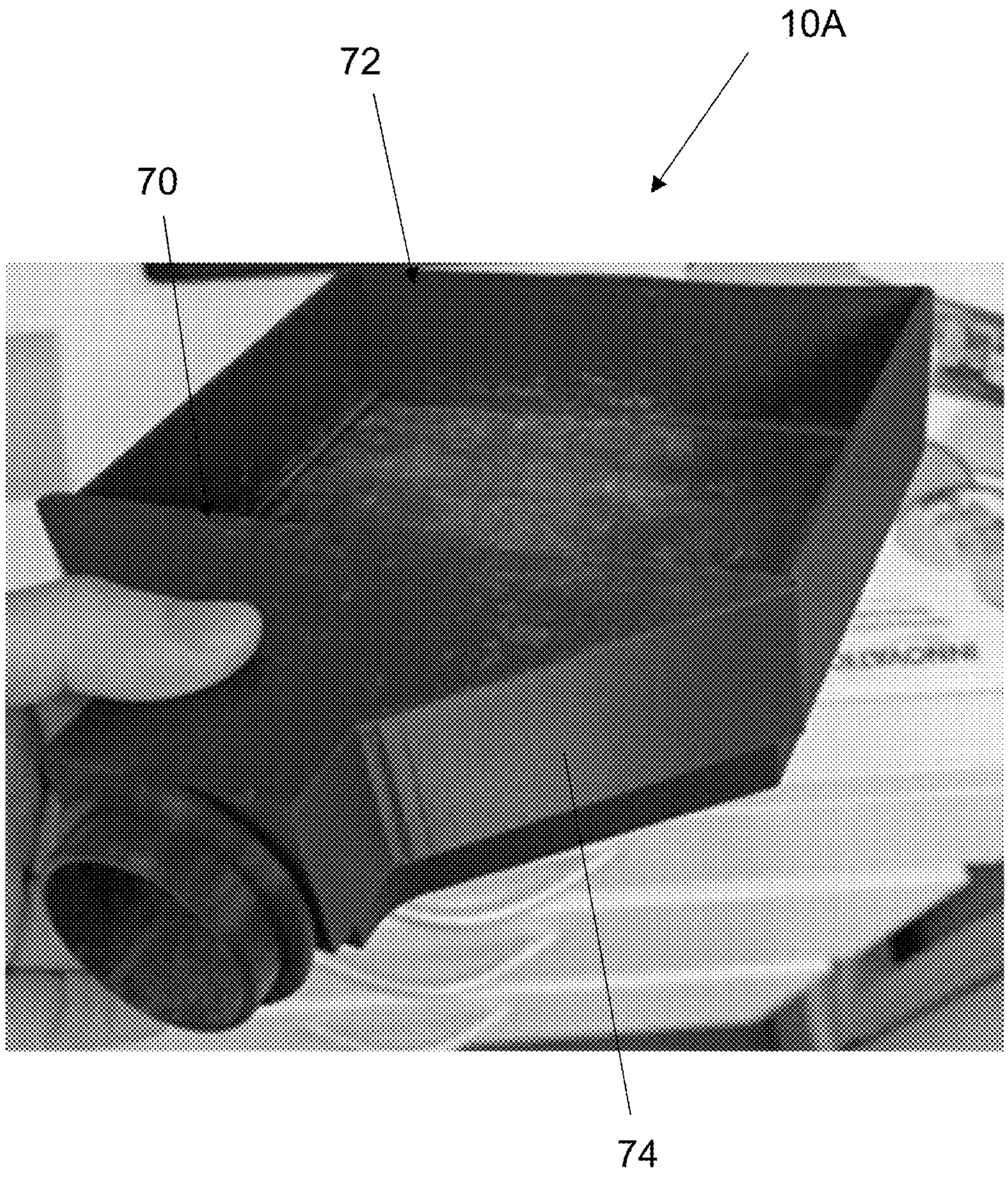
FIG. 11 is a front/left/top perspective view of a pill counter and/or viewer tray according to another embodiment of the present invention.
Figure 12:
FIG. 12 is a front/left/top perspective view of the pill counter and/or viewer tray of FIG. 11 but with a cover removed therefrom.
Figure 13:
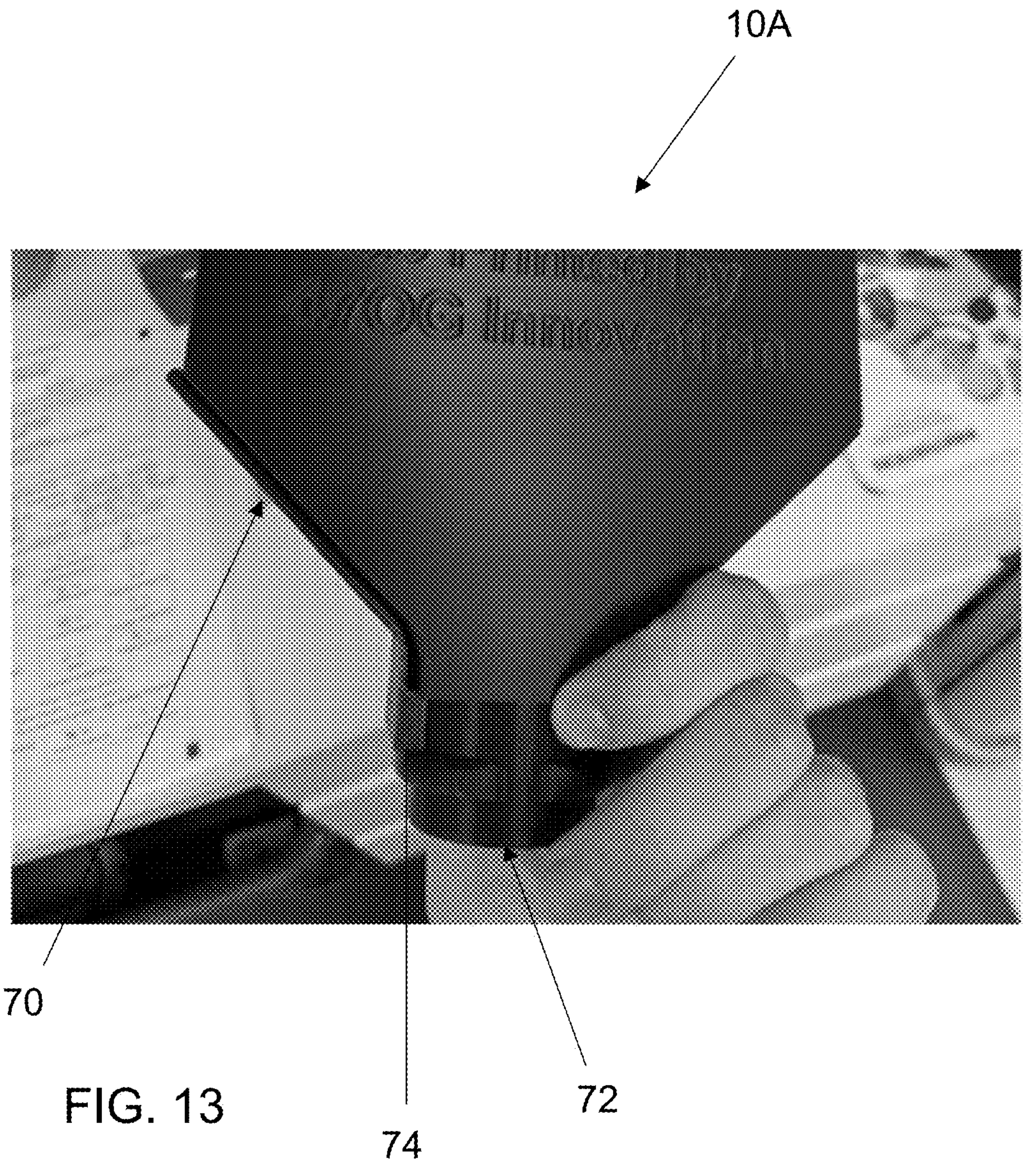
FIG. 13 is a fragmented bottom view of the pill counter and/or viewer tray of FIGS. 11 and 12.

FIGS. 11 to 13 illustrate a pill counter and/or viewer tray 10A in accordance with a second exemplary embodiment of the present invention. This pill counter and/or viewer tray 10A is substantially the same as the first embodiment described above except that a cover 70 and a base 72 are manufactured as two separate components and are attached together. The illustrated cover 70 is similar the cover 36 of the first embodiment of the pill counter and/or viewer tray 10 but also includes additional attachment structure 74 for attaching the cover 70 to the base 72. The illustrated base 72 includes the remainder of the pill counter and/or viewer tray 10 of the first embodiment other than the cover 36. The separate cover 70 is preferably fixed to the base 72 by one or more of a variety of attaching means known in the art such as, for example but not limited to, adhesives, glues, cements, welding, thermal bonding, injection molding, soldering, and the like. Alternatively, the cover 70 is removably attached (i.e., for cleaning) to the base 72 by a variety of attaching means such as, for example but not limited to, clips, clamps, screws, bolts, and the like. Regardless of whether the cover 70 is fixedly or removably attached to the base 72, it is said to be immoveable with respect thereto because, when in use, the cover 70 is fixed in position relative to the base 72. It is noted that the pill counter and/or viewer tray 10A in accordance with the second exemplary embodiment can alternatively have any other suitable configuration.

It is also noted that all or a portion of either of the covers 36, 70 can alternatively be formed of a substantially transparent material relative to the base to allow a user to visualize the entire upward facing surfaces 28, 38 and any pills located thereon.

The pill counter and/or viewer trays 10, 10A described above are preferably manufactured by 3D printing or the like. However, it will be understood that they can alternatively be manufactured by a variety of forming methods including, for example but not limited to, vacuum forming, injection molding and the like. These forming methods can provide smoothly contoured transitions between the various portions of the pill counter and/or viewer trays, thereby avoiding edges, crevices, ledges, burrs etc. where pills may become temporarily impeded and/or lodged.

Plastic known in the art may be used to provide pill counter and/or viewer trays 10, 10A capable of withstanding repetitive use as well as high impact forces, such as when inadvertently dropped to the floor. For example, but not limited to, high-density polyethylene (HDPE), low density polyethylene (LDPE), polypropylene (PP) and the like. Due to the wide variety pill colors and compositions, the polymers used to form the pill tray, or at least portions thereof, preferably include a color that provides a high contrast.

The pill viewing and/or counting a pill counter and/or viewer trays 10, 10A described above may comprise a variety of sizes and shapes and is in no way limited to the shapes, dimensions, and/or proportions shown in the present figures.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

It should be understood that every maximum numerical limitation used herein includes every lower numerical limitation, as if such lower numerical limitations were expressly written herein. Every minimum numerical limitation used herein includes every higher numerical limitation, as if such higher numerical limitations were expressly written herein. Every numerical range herein includes every narrower numerical range that falls within such broader numerical range, as if such narrower numerical ranges were all expressly written herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A pharmacy pill tray for at least one of viewing and counting pills for use with a pill vial having an external thread, said pharmacy pill tray comprising:

a viewing portion comprising a substantially-planar floor surface for supporting the pills thereon;

an enclosed funnel extending from the viewing portion and configured to selectively receive pills from the floor surface; and a spout extending from the enclosed funnel and having an inner diameter provided with a structure sized and shaped to selectively cooperate with the external thread of the pill vial and removably secure the spout to the pill vial for transferring pills between the spout and the pill vial.

2. The pharmacy pill tray according to claim 1, wherein the structure is a radially inwardly extending tab.

3. The pharmacy pill tray according to claim 1, wherein the spout is tubular shaped having a circular-shaped outer surface with a substantially constant outer diameter and a circular-shaped inner surface with a substantially constant inner diameter.

4. The pharmacy pill tray according to claim 3, wherein the spout includes a passage therethrough from an inlet opening at a rearward end of the spout and coinciding with an outlet opening of the funnel to an outlet opening at a forward end of the spout.

5. The pharmacy pill tray according to claim 1, wherein a passage extends entirely through the funnel from an inlet opening at a rearward end to an outlet opening at a forward end.

6. The pharmacy pill tray according to claim 5, wherein the inlet opening is rectangular shaped, and the inlet end is circular shaped.

7. A pharmacy pill tray for at least one of viewing and counting pills for use with a first pill vial having an external thread and a second pill vial that is larger than the first pill vial, said pharmacy pill tray comprising:

a viewing portion comprising a substantially-planar floor surface for supporting the pills thereon;

an enclosed funnel extending from the viewing portion and configured to selectively receive pills from the floor surface; and a spout extending from the enclosed funnel and having an inner diameter provided with a structure sized and shaped to selectively cooperate with the external thread of the first pill vial and removably secure the spout to the pill vial for transferring pills between the spout and the first pill vial and an outer diameter sized to selectively be closely inserted into the second pill vial.

8. The pharmacy pill tray according to claim 7, wherein the structure is a radially inwardly extending tab.

9. The pharmacy pill tray according to claim 7, wherein the spout is tubular shaped having a circular-shaped outer surface with a substantially constant outer diameter and a circular-shaped inner surface with a substantially constant inner diameter.

10. The pharmacy pill tray according to claim 9, wherein the spout includes a passage therethrough from an inlet opening at rearward end of the spout and coinciding with an outlet opening of the funnel to an outlet opening at a forward end of the spout.

11. The pharmacy pill tray according to claim 7, wherein a passage extends entirely through the funnel from an inlet opening at a rearward end to an outlet opening at a forward end.

12. The pharmacy pill tray according to claim 11, wherein the inlet opening is rectangular shaped, and the inlet end is circular shaped.

13. The pharmacy pill tray according to claim 7, wherein a forward-facing abutment is located at an interface between the spout and the funnel which can be engaged when the spout is selectively inserted into the second pill vial.

14. A pharmacy pill tray for at least one of viewing and counting pills comprising:

a viewing portion comprising a-first substantially-planar first floor surface for supporting the pills thereon;

a connecting portion extending from the viewing portion and comprising a substantially-planar second floor surface for supporting the pills thereon and extending from the first floor surface;

an enclosed funnel extending from the connecting portion and having a passage extending from a rectangular-shaped inlet opening that opens into the connecting portion to selectively receive pills from the second floor surface to a circular-shaped outlet opening;

wherein the connecting portion is trapezoidal shaped and oriented to direct the pills toward the rectangularly-shaped inlet opening of the enclosed funnel; and a tubular-shaped spout extending from the enclosed funnel to receive the pills from the circular-shaped outlet opening of the funnel and having a circular-shaped outer surface with a substantially constant outer diameter and a circular-shaped inner surface with a substantially constant inner diameter.

15. The pharmacy pill tray according to claim 14, wherein the inner diameter of the spout is provided with a structure sized and shaped to selectively cooperate with an external thread of a pill vial and removably secure the spout to the pill vial for transferring pills between the spout and the pill vial.

16. The pharmacy pill tray according to claim 15, wherein the structure is a radially inwardly extending tab.

17. The pharmacy pill tray according to claim 14, wherein the spout includes a passage therethrough from an inlet opening at a rearward end of the spout and coinciding with the circular-shaped outlet opening of the funnel to an outlet opening at a forward end of the spout.

18. The pharmacy pill tray according to claim 14, wherein an outer diameter of the spout is sized to be selectively and closely inserted into a pill vial.

19. The pharmacy pill tray according to claim 18, wherein a forward-facing abutment is located at an interface between the spout and the funnel which can be engaged when the spout is selectively inserted into the pill vial.

20. The pharmacy pill tray according to claim 14, wherein the connecting portion includes a cover located over at least a portion of the second floor surface and spaced above the first floor surface.

* * * * *